United States Patent
Bell et al.

(10) Patent No.: US 10,628,843 B2
(45) Date of Patent: Apr. 21, 2020

(54) SYSTEMS AND METHODS FOR FACILITATING LOYALTY REWARD ENVIRONMENTS

(71) Applicant: MASTERCARD INTERNATIONAL INCORPORATED, Purchase, NY (US)

(72) Inventors: Adam Robert Bell, West Harrison, NY (US); Benjamin M. Berger, Rye Brook, NY (US); Edward R. Tempesta, Bayside, NY (US); Nikhil Anand Malgatti, Ridgefield, CT (US); Pavel Umanski, Yorktown Heights, NY (US); Pranit Flora, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 122 days.

(21) Appl. No.: 15/499,783

(22) Filed: Apr. 27, 2017

(65) Prior Publication Data

US 2018/0315071 A1 Nov. 1, 2018

(51) Int. Cl.
*G06Q 30/00* (2012.01)
*G06Q 30/02* (2012.01)

(52) U.S. Cl.
CPC ..... *G06Q 30/0227* (2013.01); *G06Q 30/0229* (2013.01); *G06Q 30/0234* (2013.01); *G06Q 30/0267* (2013.01)

(58) Field of Classification Search
CPC ........... G06Q 30/0227; G06Q 30/0234; G06Q 30/0229

(Continued)

(56) References Cited

U.S. PATENT DOCUMENTS

| 6,594,640 B1 * | 7/2003 | Postrel ................ G06Q 20/06 705/14.27 |
| 7,647,278 B1 * | 1/2010 | Foth .................... G06Q 20/10 380/270 |

(Continued)

OTHER PUBLICATIONS

Xu, et al., "Tourists as Mobile Gamers: Gamification for Tourism Marketing." Journal of Travel & Tourism Marketing, 2015. (Year: 2015).*

*Primary Examiner* — Luis A Brown
(74) *Attorney, Agent, or Firm* — Harness, Dickey & Pierce, P.L.C.

(57) ABSTRACT

Systems and methods are provided for offering loyalty rewards for transactions. One exemplary method includes associating, by a computing device, a merchant with a group of reward offerors, and associating, by the computing device, a consumer payment account with a group of reward offerees. The method also includes receiving, by the computing device, and advertising to the reward offerees, a reward offer from the merchant; receiving a transaction associated with the merchant and with the consumer payment account, and identifying, in a data structure, the merchant as a member of the group of reward offerors and the consumer payment account as associated with the group of reward offerees. The method then further includes, based on the advertised reward offer and on the identified merchant, updating, by the computing device, a loyalty reward account associated with the consumer payment account.

15 Claims, 5 Drawing Sheets

US 10,628,843 B2
Page 2

(58) Field of Classification Search
USPC .................. 705/14.1, 14.17, 14.3, 14.64
See application file for complete search history.

(56) References Cited

U.S. PATENT DOCUMENTS

| | | | |
|---|---|---|---|
| 8,380,177 B2* | 2/2013 | Laracey | G06Q 30/0253 455/414.1 |
| 10,068,378 B2* | 9/2018 | Cabanier | G06F 3/011 |
| 10,360,592 B1* | 7/2019 | Emigh | G06Q 30/0226 |
| 2001/0054003 A1* | 12/2001 | Chien | G06Q 20/04 705/14.17 |
| 2002/0026348 A1* | 2/2002 | Fowler | G06Q 30/02 705/14.11 |
| 2002/0082920 A1* | 6/2002 | Austin | G06Q 30/02 705/14.25 |
| 2004/0122736 A1* | 6/2004 | Strock | G06Q 30/02 705/14.31 |
| 2005/0159996 A1* | 7/2005 | Lazarus | G06Q 30/02 705/7.31 |
| 2006/0105838 A1* | 5/2006 | Mullen | A63F 13/25 463/31 |
| 2007/0156515 A1* | 7/2007 | Hasselback | G06Q 30/02 705/14.27 |
| 2007/0244741 A1* | 10/2007 | Blume | G06Q 30/02 705/7.31 |
| 2008/0097846 A1* | 4/2008 | Oikawa | G06Q 20/327 705/14.1 |
| 2008/0196060 A1* | 8/2008 | Varghese | H04N 7/16 725/34 |
| 2010/0262456 A1* | 10/2010 | Feng | G06Q 30/02 705/14.3 |
| 2010/0324990 A1* | 12/2010 | D'Angelo | G06Q 10/10 705/14.46 |
| 2011/0022455 A1* | 1/2011 | Wolf | G06Q 30/02 705/14.27 |
| 2011/0184792 A1* | 7/2011 | Butcher | G06Q 10/10 705/14.13 |
| 2011/0221656 A1* | 9/2011 | Haddick | G02B 27/017 345/8 |
| 2011/0246287 A1* | 10/2011 | Wright | G06Q 10/00 705/14.45 |
| 2011/0320250 A1* | 12/2011 | Gemmell | G06Q 30/02 705/14.16 |
| 2012/0054001 A1* | 3/2012 | Zivkovic | G06Q 30/0207 705/14.1 |
| 2012/0064874 A1* | 3/2012 | Pierce, Jr. | H04M 1/72522 455/418 |
| 2012/0066035 A1* | 3/2012 | Stanger | G06Q 30/0207 705/14.1 |
| 2012/0204307 A1* | 8/2012 | De Mattei | G09F 27/00 2/69 |
| 2012/0221392 A1* | 8/2012 | Baker | G06Q 30/0207 705/14.17 |
| 2012/0221403 A1* | 8/2012 | Brown | G06Q 30/02 705/14.35 |
| 2012/0242697 A1* | 9/2012 | Border | G02B 27/0093 345/633 |
| 2012/0242698 A1* | 9/2012 | Haddick | G06F 3/011 345/633 |
| 2012/0249797 A1* | 10/2012 | Haddick | G06F 1/163 348/158 |
| 2013/0006737 A1* | 1/2013 | Goldberg | G06Q 30/02 705/14.12 |
| 2013/0073459 A1* | 3/2013 | Zacarias | G06Q 20/36 705/41 |
| 2013/0127980 A1* | 5/2013 | Haddick | G06F 3/013 348/14.08 |
| 2013/0144674 A1* | 6/2013 | Kim | G06Q 30/0207 705/7.19 |
| 2013/0178257 A1* | 7/2013 | Langseth | G06T 17/05 463/4 |
| 2013/0278631 A1* | 10/2013 | Border | G06F 3/04842 345/633 |
| 2013/0314303 A1* | 11/2013 | Osterhout | G06F 3/005 345/8 |
| 2013/0317944 A1* | 11/2013 | Huang | G01S 5/0252 705/26.61 |
| 2014/0032298 A1* | 1/2014 | Corrie | G06Q 30/0246 705/14.27 |
| 2014/0063054 A1* | 3/2014 | Osterhout | G06F 3/005 345/633 |
| 2014/0063055 A1* | 3/2014 | Osterhout | G06F 3/005 345/633 |
| 2014/0136307 A1* | 5/2014 | Jordan | G06Q 30/0224 705/14.25 |
| 2014/0257955 A1* | 9/2014 | Powell | G06Q 30/0233 705/14.23 |
| 2014/0315584 A1* | 10/2014 | Cheng | H04W 4/023 455/456.3 |
| 2015/0193867 A1* | 7/2015 | Del Vecchio | G06Q 40/02 705/39 |
| 2015/0206343 A1* | 7/2015 | Mattila | G06T 17/05 345/420 |
| 2015/0262208 A1* | 9/2015 | Bjontegard | G06Q 30/0205 705/7.31 |
| 2015/0262247 A1* | 9/2015 | Bonello | G06Q 30/0269 705/14.66 |
| 2015/0309316 A1* | 10/2015 | Osterhout | G06F 3/012 345/8 |
| 2016/0092923 A1* | 3/2016 | Grenier | G06Q 30/0261 705/14.36 |
| 2016/0098860 A1* | 4/2016 | Basra | H04L 67/325 345/633 |
| 2016/0109954 A1* | 4/2016 | Harris | G06F 3/017 345/156 |
| 2016/0136522 A1* | 5/2016 | Hsu | A63F 13/42 463/40 |
| 2016/0187654 A1* | 6/2016 | Border | G02B 5/04 359/567 |
| 2016/0209648 A1* | 7/2016 | Haddick | G02B 27/0093 |
| 2017/0039613 A1* | 2/2017 | Kaehler | G02B 27/0172 |
| 2017/0068984 A1* | 3/2017 | Joshi | G06Q 30/0226 |
| 2017/0228756 A1* | 8/2017 | Reimer | G06Q 30/0224 |
| 2017/0293932 A1* | 10/2017 | Clark | G06Q 20/10 |
| 2018/0101858 A1* | 4/2018 | Chaudhury | G06Q 30/0238 |
| 2018/0124148 A1* | 5/2018 | Boudville | H04L 67/02 |
| 2018/0260833 A1* | 9/2018 | Khan | G06Q 20/322 |
| 2018/0315071 A1* | 11/2018 | Bell | G06Q 30/0227 |

* cited by examiner

US 10,628,843 B2

SYSTEMS AND METHODS FOR FACILITATING LOYALTY REWARD ENVIRONMENTS

FIELD

The present disclosure generally relates to systems and methods for facilitating consumer loyalty through loyalty reward environments, and in particular, for building consumer loyalty to merchants via incentives from the merchants included in the loyalty reward environments, and through which the consumers are permitted to navigate and earn the incentives.

BACKGROUND

This section provides background information related to the present disclosure which is not necessarily prior art.

Consumers are known to use one or multiple payment accounts to fund transactions for different types of products (e.g., goods and services, etc.), from different merchants. The transactions to the payment accounts result in transaction data, associated with authorization, settlement and/or clearing of the transactions, being compiled by, for example, the merchants and the payment networks processing the transactions. The transaction data is known to be used, in combination with various algorithms, as a basis to select and issue offers and/or coupons to consumers. For example, when a consumer purchases a product, a coupon may be issued to the consumer for a competing product, at the time of purchase or at a later time when the previously purchased product is to be replenished. Separately, consumers are known to use loyalty accounts associated with merchants to accumulate rewards or benefits for making purchases at the merchants or for generally being loyal to the merchants. Not unlike payment accounts, loyalty accounts are known to give rise to offers and/or coupons from the merchants to which the loyalty accounts belong.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Many merchants and other entities offer loyalty reward programs as a strategy to encourage business with consumers, and then repeat business with the consumers. The loyalty reward programs take many forms throughout various industries, and can include something as simple as a punch card at a local sandwich shop to a loyalty card that accrues value for transactions at one or more particular merchants. The merchants typically expend such effort related to the loyalty services in order to retain existing consumers, while also gaining additional consumers, etc. Uniquely, the systems and methods herein provide a loyalty reward environment, which is accessible to consumers (offerees) and merchants (offerors), where incentives are included by the merchants and then earned and/or achieved by the consumers through interaction and gamification within the environment. In particular, in connection with the loyalty reward environment, a loyalty engine is provided with incentives at the direction of multiple merchants. Consumers are then able to utilize a network-based application, in a portable communication device, to interact with their surroundings (e.g., by location, through virtual characters and entities, etc.) and to navigate within the loyalty reward environment to discover and/or unlock and/or achieve (broadly, obtain) the incentives offered by the merchants (generally automatically). In this manner, the incentives are provided by the merchants into the loyalty reward environment, which dictates certain activities, including, for example, the consumers' presence at the merchants, etc., in order for the consumers to obtain the incentives. The loyalty reward environment may further, in some instances, be incorporated and/or interactive with social media to enhance the experience, allowing the consumers to interact with other consumers. Moreover, the incentives obtained in the loyalty reward environment may, in some embodiments, be saved, combined and/or converted to other incentives, prior to redemption, whereby interactions with the loyalty reward environment over time may permit the consumers to further achieve more valuable incentives.

Figure 1:
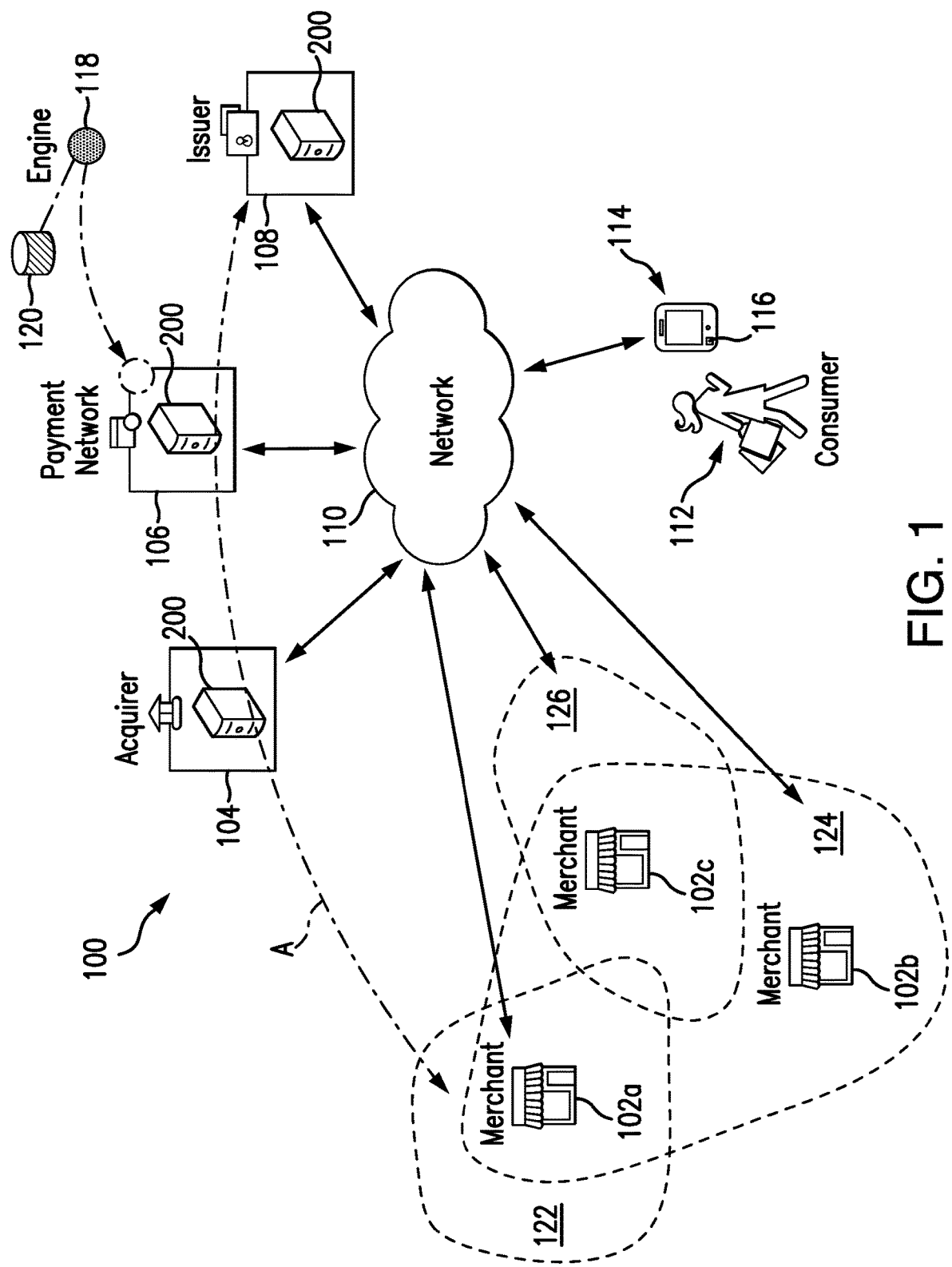
FIG. 1 is a block diagram of an exemplary system of the present disclosure suitable for use in providing a loyalty reward environment to consumers.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, implementation of a loyalty reward environment in the system 100, relationships between a loyalty engine and a payment network, an issuer, and/or a merchant, etc. in the system 100, etc.

The system 100 generally includes merchants 102a-c, an acquirer 104 associated with at least one of the merchants 102a-c, a payment network 106, and an issuer 108 configured to issue payment accounts (or other accounts) to consumers, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchants 102a-c, the payment network 106, and a consumer 112 (or, more specifically, a communication device 114 associated with the consumer 112), etc.

The merchants 102a-c are generally provided to offer products (e.g., goods and/or services, etc.) for sale to consumers in the system 100, including consumer 112. The merchants 102a-c may offer the products for sale in physical locations or through virtual locations (e.g., websites, etc.), as desired.

In some embodiments, the consumer 112 is able to fund transactions with the merchants 102a-c for one or more of the products, via a payment account. More specifically, in the system of FIG. 1, the consumer 112 is associated with a payment account, which is issued by the issuer 108. The payment account is associated with a payment device, such as, for example, a credit card, a debit card, a fob, etc. In addition in this exemplary embodiment, the consumer 112 is associated with network-based application 116 installed at the communication device 114. Among other features, the application 116 includes a virtual wallet for the consumer 112 (e.g., MasterPass®, Apple Pay®, Samsung Pay®, PayPal®, Google Wallet®, Android Wallet™, etc.), which once installed/registered, is active in the communication device 114 and is provisioned with one or more payment credentials associated with the consumer's payment account (e.g., a primary account number (PAN), a card verification code (CVC), an expiration date, etc.). With that said, when the communication device 114 is described as configured to perform various operations herein, it should be appreciated that it may be doing so generally in coordination with the application 116 (even if the application 116 is not specifically referenced), or not.

In one example, the consumer 112 may initiate a transaction with the merchant 102a, for example, for the purchase of a product, by presenting the communication device 114 to the merchant 102a (as a payment device, via the application 116), to a point of sale (POS) terminal at the merchant 102a. In turn, the POS terminal reads the payment account credential(s) for the consumer's payment account from the communication device 114, and compiles and submits an authorization request for the transaction to the acquirer 104 (associated with the merchant 102a), along path A, as referenced in FIG. 1. The acquirer 104 then communicates the authorization request with the issuer 108 (associated with the consumer's payment account), through the payment network 106 (e.g., through MasterCard®, VISA®, Discover®, American Express®, etc.) to determine whether the payment account is in good standing and whether there is sufficient funds and/or credit to cover the transaction. In turn, if the transaction is approved, an authorization reply or response (indicating the approval of the transaction) is transmitted back from the issuer 108 to the merchant 102a, along path A, thereby permitting the merchant 102a to complete the transaction. The transaction is later cleared and/or settled by and between the merchant 102a, the acquirer 104, and the issuer 108 by appropriate agreements. If the transaction is declined, however, the authorization reply (indicating the decline of the transaction) is provided back to the merchant 102a, along the path A, thereby permitting the merchant 102a to halt or terminate the transaction.

Although the above transaction is described with reference to the merchant 102a, it should be appreciated that a transaction with either the merchant 102b or the merchant 102c would be substantially consistent with the above described transaction.

Transaction data is generated, collected, and stored as part of the above interactions among the merchant 102a (and potentially the merchants 102b-c in other transactions), the acquirer 104, the payment network 106, the issuer 108, and the consumer 112. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the merchant 102a, the acquirer 104 and/or the issuer 108 may store the transaction data, or part thereof, in a data structure, or transaction data may be transmitted between parts of system 100 as used or needed. In general, the transaction data may include, for example, PANs for payment accounts involved in the transactions, amounts of the transactions, merchant IDs for merchants involved in the transactions, merchant category codes (MCCs), dates/times of the transactions, products purchased and related descriptions or identifiers, etc. It should be appreciated that more or less information related to transactions, as part of either authorization or clearing and/or settling, may be included in transaction records and stored within the system 100, at the merchants 102a-c, the acquirer 104, the payment network 106 and/or the issuer 108.

In various exemplary embodiments, consumers (e.g., consumer 112, etc.) involved in the different transactions herein are prompted to agree to legal terms associated with their payment accounts, for example, during enrollment in their accounts, during installation of payment applications to their communication devices, etc. In so doing, the consumers may voluntarily agree, for example, to allow merchants, issuers, payment networks, etc., to use data collected during enrollment and/or collected in connection with processing the transactions, subsequently for one or more of the different purposes described herein.

While three merchants 102a-c, one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 and other system embodiments will generally include multiple consumers, each associated with a communication device generally having the application 116 installed thereon or accessible thereby.

Figure 2:
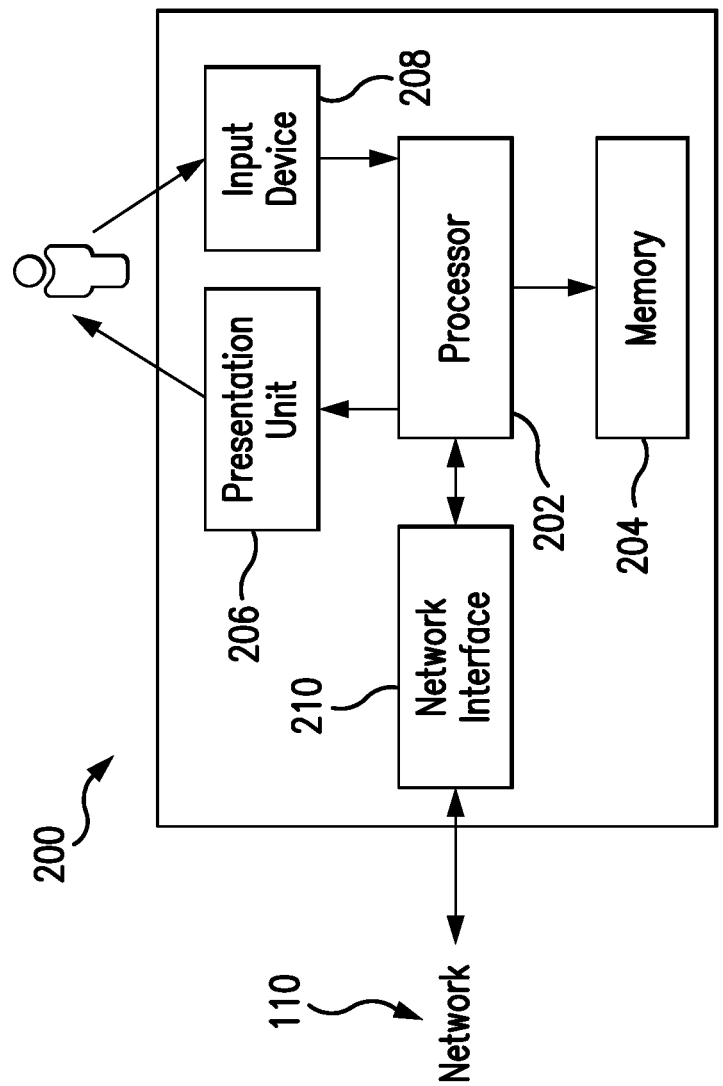
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the acquirer 104, the payment network 106, and the issuer 108 are illustrated as including, or being implemented in, computing device 200, coupled to (and in communication with) the network 110. In addition, the merchants 102a-c may be considered as including and/or being implemented in at least one computing device consistent with computing device 200. Further, the communication device 114 associated with consumer 112 can also be considered a computing device consistent with computing device 200 for purposes of the description herein. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account information (e.g., payment account credentials, etc.), loyalty account information, consumer and/or merchant profiles, loyalty reward environment interfaces, loyalty reward incentives, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., loyalty reward incentives, loyalty account totals, etc.), visually, for example, to a user of the computing device 200, such as the consumer 112 in the system 100; users associated with one or more of the merchants 102a-c; etc. And, various interfaces (e.g., as defined by web-based applications such as application 116, as defined by websites, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, inputs by the consumer 112 on his/her communication device 114 in response to prompts from the application 116, as further described below. The input device 208 may include a single input device or multiple input devices. The input device 208 is coupled to (and is in communication with) the processor 202 and may include, for example, one or more of a keyboard, a pointing device, a mouse, a stylus, a barcode scanner, a QR code scanner, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to one or more different networks, including the network 110. Further, in some exemplary embodiments, the computing device 200 includes the processor 202 and one or more network interfaces incorporated into or with the processor 202. In various embodiments, the computing device 200 includes a global positioning system (GPS) capability whereby the computing device 200 may determine its current geographic location, perform mapping applications, etc. For example, the consumer 112 may utilize the GPS capability of his/her communication device 114 to locate offers of loyalty rewards generated as virtual objects, as described below.

Referring again to FIG. 1, the system 100 includes a loyalty engine 118, which is specifically configured, by computer executable instructions, to perform one or more of the operations described herein. In the illustrated embodiment, the loyalty engine 118 is provided as a separate part of the system 100 and in communication with the payment network 106, for example. As such, the loyalty engine 118 may be considered a computing device consistent with computing device 200. However, as indicated by the dotted line in FIG. 1, the loyalty engine 118 may be incorporated, partly or entirely, into the payment network 106 in the illustrated system 100. With that said, it should be appreciated that the loyalty engine 118 may be associated with, or incorporated with, other parts of the system 100, in other embodiments, including, for example, one or more of the merchants 102a-c, the acquirer 104, and/or the issuer 108, etc. In addition, while the system 100 is illustrated as including only one loyalty engine 118, it should be appreciated that multiple such loyalty engines may be included in the system 100 in other embodiments (and associated with and/or incorporated in, partly or entirely, one or more parts of the system 100, whereby the multiple loyalty engines may operate, as described herein, in cooperation together, or separately, for the consumer 112, or for multiple consumers. Further, when such multiple loyalty engines are included, the operations described herein as executed by the loyalty engine 118 may, in some embodiments, be divided between the multiple loyalty engines, located together or distributed over a geographic region, in the system 100, and/or be performed by the application 116 included in the communication device 114.

The system 100 also includes a loyalty data structure 120, which is coupled to (and is in communication with) the loyalty engine 118. The loyalty data structure 120 includes profiles for multiple consumers and multiple merchants registered to the loyalty engine 118, as described herein (e.g., that have elected to take part in the loyalty reward environment described herein, etc.). The loyalty data structure 120 may be a standalone part of the system 100, as shown in FIG. 1, or it may be included in memory of the loyalty engine 118 (e.g., memory 204, etc.) or elsewhere in the system 100. Likewise, it should be understood that the loyalty data structure 120 may be divided into separate structures, stored at separate parts of the system 100, and accessed from separate locations.

Generally in the system 100, the loyalty engine 118 is configured to register the merchants 102a-c to the loyalty engine 118. In particular, the loyalty engine 118 is configured to enable the merchants 102a-c to register to the loyalty engine 118 (e.g., via a website associated with the loyalty engine 118, via a network-based application made available by the loyalty engine 118 to the merchant 102c, etc.) and to identify incentives, for the merchants 102a-c, to be used by the loyalty engine 118 as described herein (e.g., within a loyalty reward environment, etc.).

In connection with such merchant registration, the loyalty engine 118 is configured to initially generate a profile for each of the merchants 102a-c and store the profile in the loyalty data structure 120. The merchant profiles generally include, without limitation, names of the merchants 102a-c, merchant locations (e.g., as defined by geofences, etc.), merchant categories for the merchants 102a-c, merchant types (e.g., online merchants, physical merchants, etc.), etc. The merchant profiles may further include indicators of likelihood for consumers to complete transactions at the merchants 102a-c, spending patterns at the merchants 102a-c (e.g., affluence, ticket size, tier-based, etc.), consumer behavior/patterns at the merchants 102a-c, weather-based spending preferences for the merchants 102a-c (e.g., dependence of a car-wash merchant on weather, etc.), temporal transaction patterns for the merchants 102a-c (e.g., by time, day, date, etc.), affinity of the merchants 102a-c to other merchants, association of the merchants 102a-c to competitive merchants, association of the merchants 102a-c to complimentary merchants, etc.

Also at registration, the loyalty engine 118 is configured to place the merchants 102a-c in one or more groups (e.g., based on merchant association rules, based on sequencing features, etc.) (broadly, based on factors), and then append the merchants 102a-c to those groups in the loyalty data structure 120. Additionally, or alternatively, the loyalty engine 118 may be configured to solicit, through one or more interfaces, input from the merchants 102a-c indicating in which group or groups the merchants 102a-c themselves desire to be included. In connection therewith, the loyalty engine 118 may be configured to permit the merchants 102a-c to browse existing groups, to browse factors related to those groups, and/or to browse merchants within those groups, prior to appending the merchants 102a-c to a particular one (or ones) of the groups. The input from the merchants 102a-c may then be used alone (such that the merchants 102a-c dictate the particular group(s) for their association), or in combination with the above factors, in appending or not appending the merchants 102a-c to one or more groups, or alternatively, the loyalty engine 118 may place the merchants 102a-c in one or more groups without any input the from the merchants 102a-c.

As shown in FIG. 1, for example, the merchant 102a is included in a first merchant group 122 and a second merchant group 124; the merchant 102b is included in the second merchant group 124; and the merchant 102c is included in both the second merchant group 124 and a third merchant group 126. In this example (and without limitation), the different groups 122-126 include merchants that are generally complimentary to each other and likely to be visited in a string of sequential purchases by consumers (e.g., within a defined period, etc.). Identifying such merchants into the particular groups, again in this example, may be based on (without limitation) one or more of a distance between the merchants, a population density, a merchant industry of the merchants, overlapping customer bases, and existing merchant partnerships. However, it should be appreciated that one or more of the other factors described above may also (or alternatively) be used. As shown, some of the groups overlap, as merchants in one group may also relate to merchants in another group, but such overlap is not an exact match. In general, the merchant groups include groups of non-competing merchants that are relevant to a given consumer (e.g., the consumer 112, etc.). With that said, it should be appreciated that a variety of different groups may be formed by the merchants 102a-c (and by other merchants), overlapping or not, based on the various different criteria/factors used to group the merchants discussed herein, or based on other and/or additional criteria/factors, within the scope of the present disclosure.

Then, once the merchants 102a-c are included in their respective groups, the loyalty engine 118 is configured to permit the merchants 102a-c to identify incentives (e.g., offers, coupons, rebates, discounts, etc.) to be provided through the loyalty engine 118 to consumers (e.g., based on the group or groups in which they are included, etc.). In particular, the loyalty engine 118 may be configured to solicit from the merchants 102a-c, through one or more interfaces, inputs related to the incentives to be offered. In so doing, the loyalty engine 118 may solicit a percentage of payment account transactions at the merchants 102a-c to be applied to incentives, such that, for example, the merchants 102a-c are able to designate 0.25%, 0.5%, or 1.0%, or some other percentage, of the transactions performed at the merchants 102a-c to be eligible for the incentives to be disseminated by the loyalty engine 118. Additionally, or alternately, the loyalty engine 118 may be configured to permit the merchants 102a-c to create incentives unique to the merchants 102a-c and/or the products offered for sale by the merchants 102a-c, and/or select predefined incentives (i.e., "off-the-shelf" incentives, etc.). Further, the incentives may be provided in any increment (e.g., by percentage, by amount, etc.) and/or may be associated with a variety of point values (as described in more detail below).

As an example, the merchant 102a may include a pizza merchant. In connection therewith, the merchant 102a may provide (as included in the profile for the merchant 102a) an incentive whereby when the consumer 112 spends over $25.00 at the merchant 102a, the consumer 112 will receive $5.00 off his/her next purchase at the merchant 102a. As another example, the merchant 102a may again include a pizza and the merchant 102b may include an ice cream merchant located next door to the merchant 102a, such that both merchants 102a-b are identified in merchant group 124 (e.g., based on relative location, etc.). In connection therewith, the merchant 102a may provide (as included in the profile for the merchant 102a) an incentive whereby when the consumer 112 spends over $25.00 at the merchant 102a, the consumer 112 will receive a free ice cream cone at merchant 102b (based on a merchant partnership between merchant 102a and merchant 102b, etc.).

Regardless, once the incentives are identified by the merchants 102a-c, the loyalty engine 118 is configured to store the incentives, along with the group(s) for the merchants 102a-c, in the respective merchant profiles for the merchants 102*a-c* in the loyalty data structure 120 (and thereby generally complete the merchant registration). It should be appreciated that the incentives may be subsequently modified by the merchants 102*a-c* as desired, following such registration.

In this exemplary embodiment, the loyalty engine 118 is also configured to register the consumer 112 to the loyalty engine 118, through the application 116 (e.g., upon installation of the application 116 to the communication device 114, subsequent thereto, etc.). In particular, the communication device 114 is configured, by the application 116, to solicit and to receive certain information about the consumer 112, from the consumer 112, such as, for example, name, contact information, demographic information (e.g., gender, age, marital status, etc.), income information, location information, etc. In addition, and if not already done, the communication device 114 is configured, again by the application 116, to solicit and to receive from the consumer 112 and/or the issuer 108, for example, payment account information for the consumer's payment account (e.g., a PAN for the consumer's payment account, transaction data for the consumer's payment account, etc.). In connection therewith, as part of the consumer registration, the consumer 112 provides consent for the loyalty engine 118 to retrieve the transaction data, as needed, and to also receive location information data from the application 116 (and the communication device 114) to facilitate the operations described herein. Then, once received, the communication device 114 is configured to submit the information and consent to the loyalty engine 118.

In turn in registering the consumer 112, the loyalty engine 118 is configured to receive the above information and to compile a consumer profile for the consumer 112 (and his/her payment account) based thereon. In particular, the loyalty engine 118 is configured to retrieve the transaction data for the consumer's payment account, if not already received from the consumer 112 (i.e., if not received from the application 116), and to determine one or more indicators relating to likelihood for the consumer 112 to complete certain transactions, to spending patterns of the consumer 112 (e.g., affluence, ticket size, tier-based transactions, etc.), to consumer behavior/patterns, to weather-based spending preferences of the consumer 112, to temporal transaction patterns for the consumer 112 (e.g., transactions by time, day, date, etc.), to an affinity of the consumer 112 to particular merchants, etc. In this exemplary embodiment, the profile for the consumer 112, based on the consumer's transaction history, may include/indicate that the consumer 112 is a 32-year old female with two children, a likelihood of the consumer 112 to spend at merchants with high ticket sizes (e.g., ticket sizes greater than $500.00, etc.), and a presence of and/or association with children (e.g., based on multiple purchases at pizza merchants and ice cream merchants, etc.). As such, the consumer 112 will generally be targeted with offers relating to merchants with high ticket sizes and merchants that accommodate children. The profile for the consumer 112 may also include a loyalty reward account through which rewards may be tracked, accumulated, etc. for the consumer 112 at different merchants. In various other embodiments, consumer profiles may be based on transaction histories for other, similar consumers (e.g., consumers having similar demographics, similar distribution of spend across merchant industries, similar frequency/amount of spend, etc.).

In addition to the above regarding the merchant profiles for the merchants 102*a-c* and the consumer profile for the consumer 112, the loyalty engine 118 is configured to provide one or more loyalty reward environments, accessible to the consumer 112, and to include/append the incentives from the merchant profiles (in the loyalty data structure 120) in/to the loyalty reward environment. In this exemplary embodiment, the loyalty reward environment includes a virtual reality environment, which is displayed to the consumer 112 through his/her communication device 114 (e.g., via the application 116, etc.). The loyalty reward environment then includes the incentives provided by the merchants 102*a-c* as objects, characters, etc., disposed at different locations in the environment and potentially accessible through one or more different levels. With that said, and without limitation, the loyalty reward environment may further include views of the consumer's physical surrounding environment, as captured, for example, by a camera input device 208 of the communication device (e.g., as an augmented reality, as an overlay of location-based offers and incentives, etc.). Additionally, or alternatively, the loyalty reward environment may further include a map view of the consumer's current location based on location data received from the consumer's communication device 114 (e.g., with the merchants 102*a-c* and their associated incentives then also included in the map view, etc.). In any case, the loyalty reward environment is generally representative of the physical environment in the general area of the consumer 112, thereby permitting the consumers' navigation of his/her physical environment to be tracked and/or mimicked in the loyalty reward environment.

Moreover, the loyalty engine 118 is configured to interact with the application 116, at the consumer's communication device 114, to permit the consumer 112 to navigate within the loyalty reward environment through movement of, for example, the communication device 114. Specifically, once the consumer 112 is registered, the consumer 112 initiates the application 116, which in turn, in connection with the consumer profile for the consumer 112, is configured to locate the consumer 112 within the loyalty reward environment, virtually, based on the consumer's physical environment. Through the consumer's movements in his/her physical environment, then, the consumer 112 correspondingly moves within the loyalty reward environment, whereupon the consumer 112 is able to view and obtain the incentives included in the loyalty reward environment by going to the merchants 102*a-c* or other merchants in the vicinity of the consumer 112, or by performing different activities associated with the incentives, etc. For example, when the consumer 112 moves, the communication device 114 is configured, by the application 116, to transmit location data to the loyalty engine 118. The loyalty engine 118, in turn, is configured to reflect the movement in the loyalty reward environment and further to determine when/if the movement of the communication device 114, for example, is sufficient to achieve a particular incentive (or multiple particular incentives). It should be appreciated that the loyalty reward environment and/or the incentives included therein may vary based on the location of the consumer 112, the consumer profile of the consumer 112 (e.g., a level achieved, a number of obtained incentives, etc.), the merchant profiles for the merchants in the vicinity of the consumer 112, etc.

Further, in connection with facilitating the loyalty reward environment, the loyalty engine 118 may be configured to interact with one or more social network providers. In particular, the loyalty engine 118 may be configured to provide information to the social network providers indicating various incentives included in the loyalty reward environment (e.g., updated incentives, newly added incentives, etc.). In turn, the social network providers may be configured to post the information to a social network profile specific to the consumer 112 or specific to multiple consumers, or to a separate profile or board viewable by multiple consumers, as a mechanism to encourage the consumers to access the loyalty reward environment and to encourage competition between consumers, and/or to further gamify the consumers' interactions with the loyalty reward environment.

Further still, the loyalty engine 118 may be configured to interact with the application 116, when the application 116 includes and/or is associated with a payment application, to permit the incentives to be redeemed by the consumer 112 through the application 116. For example, when the consumer 112 obtains a desired incentive or multiple incentives, and elects to redeem the incentive(s), the consumer 112 may identify products for which the incentive(s) relate (e.g., at a merchant associated with the incentives, etc.) and perform purchase transactions for the products (generally, in the manner described above for the example transaction and with reference to path A in FIG. 1). In particular in this example, when the consumer 112 is presented with the incentive (or the multiple incentives), the incentive is linked to the consumer's payment account (at the application 116 and, in particular, at a virtual wallet associated therewith and at the data structure 120). Then, when the consumer 112 performs the purchase transaction for the product(s) using his/her payment account, via his/her virtual wallet, the payment network 106 identifies the transaction during the clearing/settlement as involving the incentive (based on the consumer's payment account (e.g., as linked with the incentive in the data structure 120, etc.)) and, in turn, issues a statement credit to the consumer 112 based on the incentive. As another example, when the incentives include accumulated points for a group of merchants, the consumer 112 may redeem the points from his/her loyalty reward account, whereby the redeemed points are charged to a reward account of an acquirer for the corresponding group of merchant(s).

Finally in the system 100, the loyalty engine 118 may be configured to generate one or more reports for the merchants 102a-c included in the loyalty reward environment to track incentives included in the environment (for the particular merchants 102a-c, for all merchants, etc.), rates associated with incentives being obtained and/or redeemed by consumers, consumer attendance at the merchants' location, etc. It should be appreciated that the reports, when generated by the loyalty engine 118 and issued to the merchants 102a-c, may include any content known/available to the loyalty engine 118 and/or desired by the merchants 102a-c, collectively or individually.

Figure 3:
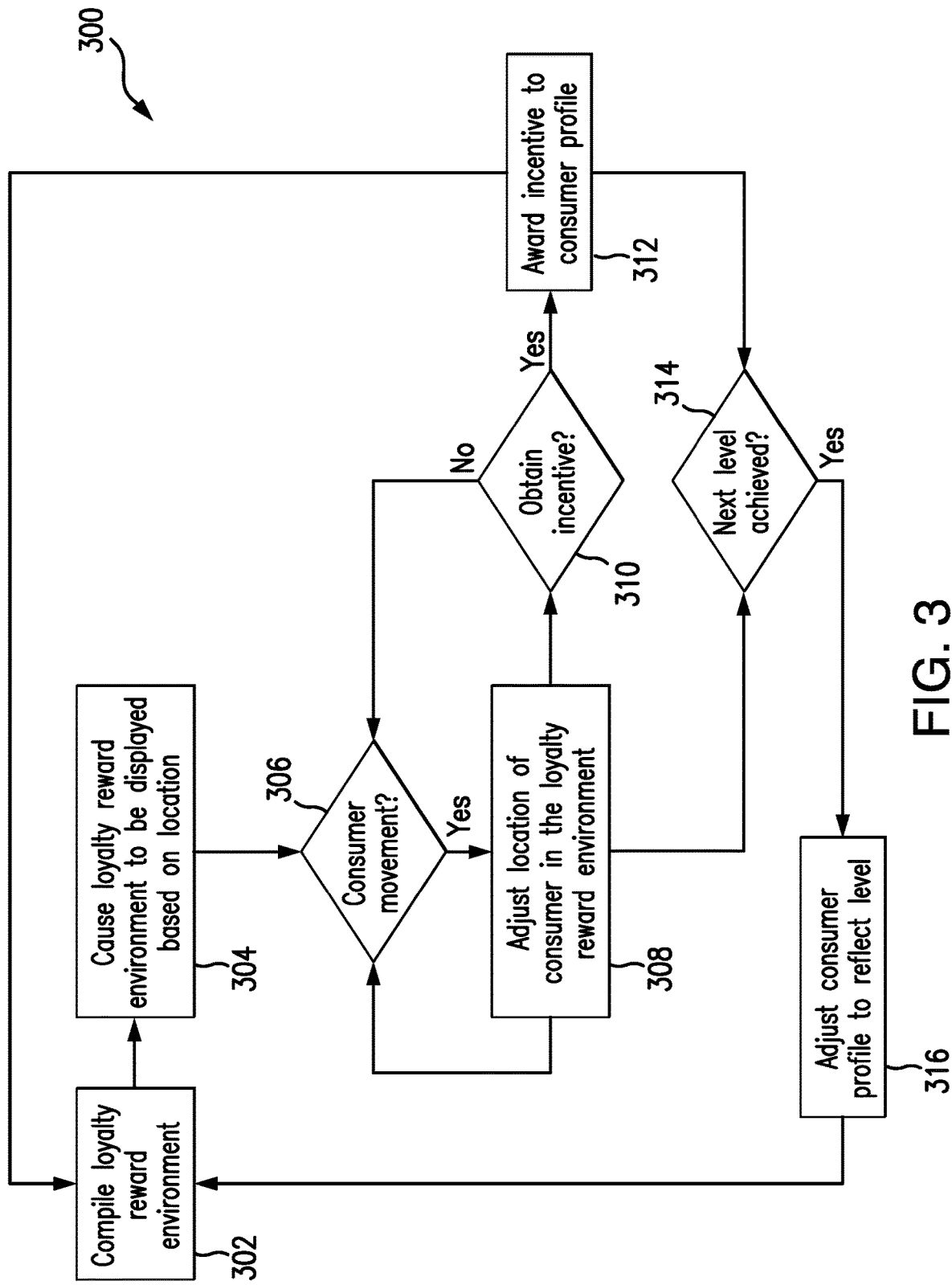
FIG. 3 is a flow diagram of an exemplary method, which may be implemented in connection with the system of FIG. 1, for offering loyalty rewards to a consumer for a transaction performed by the consumer, in connection with a loyalty reward environment provided to the consumer.

FIG. 3 illustrates an exemplary method 300 for use in facilitating consumer loyalty through a loyalty reward environment. The exemplary method 300 is described as implemented in the loyalty engine 118 of the system 100, in conjunction with the application 116 included at the consumer's communication device 114. Reference is also made to the computing device 200. However, the methods herein should not be understood to be limited to the system 100 or the computing device 200, as the methods may be implemented in other systems and/or computing device. Likewise, the systems and the computing devices herein should not be understood to be limited to the exemplary method 300.

In the illustrated method 300, as part of a shopping experience by the consumer 112, or otherwise, the application 116 launches at the consumer's communication device 114 (e.g., manually upon input from the consumer 112, automatically when the communication device 114 is present at a particular location (e.g., within a particular geofence, etc.), etc.).

In turn, the loyalty engine 118, being in communication with the application 116, compiles a loyalty reward environment for the consumer 112, at 302, and causes the loyalty reward environment to be displayed to the consumer 112, at 304 (e.g., at presentation unit 206 of the consumer's communication device 114, etc.). To compile the loyalty reward environment, the loyalty engine 118 relies on at least, in this embodiment, the consumer profile for the consumer 112 (e.g., as identified by the loyalty engine based on an application ID for the application 116 associated with the consumer 112 in the loyalty data structure 120, etc.), the location of the consumer 112 (as indicated by the communication device 114), the merchant group(s) in the identified location of the consumer 112, and the incentives in the loyalty data structure 120 for the merchants in the given merchant group(s). In particular in this embodiment, the consumer's location defines the immediate loyalty reward environment, which may include a surrounding building, a block, a square mile, or more or less. Then, within the loyalty reward environment, the loyalty engine 118 identifies available incentives for the given location and includes the incentives, as permitted by the consumer profile, in the loyalty reward environment.

As an example, in connection with compiling the loyalty reward environment for the consumer 112, the loyalty engine 118 may include an incentive (or multiple incentives) in the loyalty reward environment for the consumer 112 from the merchant 102a, based on the profile for the consumer 112 (e.g., the consumer's profile may include/indicate a likelihood of the consumer 112 to spend at merchants with high ticket sizes (e.g., ticket sizes greater than $500.00, etc.) and a presence of and/or association with children (e.g., based on multiple purchases at pizza merchants and ice cream merchants, etc.), etc.). In connection therewith, the incentive(s) may include, for example, 20% off the consumer's next purchase at the merchant 102a when the consumer 112 spends over $200 in the next two months at the merchant 102a; 40% off the consumer's next purchase at the merchant 102a when the consumer 112 is in the top 5% of spending consumers at the merchant 102a in the next month; and/or 10% off the consumer's next purchase the merchant 102a when the consumer sends a 10% coupon for the merchant 102a to another consumer.

As another example, the consumer profile for the consumer 112 may include a particular incentive level, which the consumer 112 has achieved through prior interaction with the loyalty engine 118, based on time of such interaction, incentives obtained (e.g., a number of incentives obtained, an aggregate value of incentives obtained, etc.), skill of the consumer 112, etc. The incentive level of the consumer 112 may then indicate that certain incentives, within the data structure 120, are to be included in the loyalty reward environment for the consumer 112, while others are not. And, as the level of the consumer 112 changes (e.g., increases, decreases, etc.), the incentives included by the loyalty engine 118 in the loyalty reward environment may also change.

As still another example, incentives may be included in the loyalty reward environment based on the merchants 102a-c, for example, when the merchants 102a-c are within a defined distance of the consumer 112 (e.g., when the merchants 102a-c are within a location defined by the loyalty reward environment compiled for the consumer 112, when the consumer is within a geofence associated with the one or more of the merchants 102*a*-*c*, etc.). Additionally, the loyalty engine 118 may include incentives in the loyalty reward environment based on the merchant groups described above in the system 100 (e.g., groups 122-126, etc.). For example, the loyalty engine 118 may include an incentive in the loyalty reward environment whereby the consumer 112 receives a 10% discount on his/her next purchase at merchant 102*b* when the consumer 112 spends over $50.00 at merchant 102*a* (such that the incentive is based on the relationship of the merchants 102*a* and 102*b* in the merchant group 124).

Figure 4:
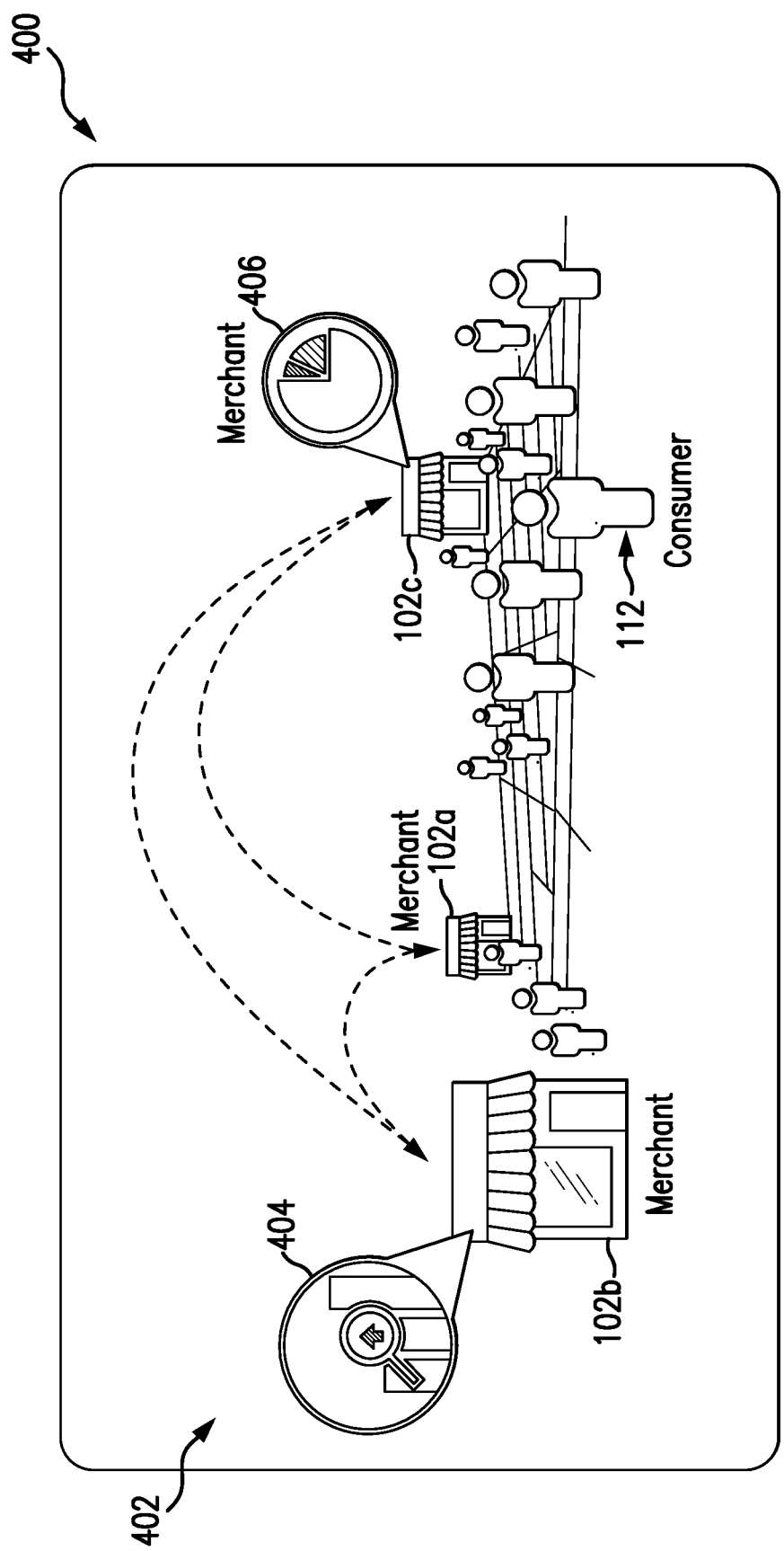
FIG. 4 is a diagram illustrating an exemplary loyalty reward environment having a plurality of merchants associated as a group of reward offerors and a plurality of consumers associated as a group of reward offerees.

FIG. 4 illustrates an exemplary loyalty reward environment interface 400 that may be displayed to the consumer 112 at the communication device 114 in connection with the method 300. As shown, the interface 400 includes a virtual representation 402 of the immediate surroundings of the consumer 112 (e.g., a loyalty reward environment, etc.), including merchants 102*a*-*c*. In addition, in this example, the virtual representation 402 includes two incentives 404 and 406, associated with the respective merchants 102*b* and 102*c*. As shown, each of the incentives 404 and 406 is represented in the loyalty reward environment interface 400 by a particular symbol or character. Specifically in the interface 400, the incentive 404 is depicted by a bar chart and includes, for example, 10% off the consumer's next purchase at the merchant 102*b* when the consumer 112 increases his/her spending at the merchant 102*b* in the next month; and the incentive 406 is depicted by a pie chart and includes, for example, 20% off the consumer's next purchase at the merchant 102*c* when the consumer 112 is in the top 5% of spending consumers at the merchant 102*c* in the next month. With that said, it should be appreciated that any symbol and/or character may be used to represent incentives in the virtual representation 402 of the consumer's surroundings. What's more, the symbol and/or character may be indicative of the associated merchant, the incentive, a value of the incentive (e.g., a "5" representative of 5 points, a "5%" representative of a 5% discount, a "T" representative of a mystery incentive, etc.), etc., or not.

Also in the exemplary loyalty reward environment interface 400, along with the incentives, the merchants 102*a*-*c* are distinguished from each other by associated characters and/or symbols (e.g., through use of different building symbols, etc.). And, the incentives 404 and 406 associated with the corresponding merchants 102*a* and 102*b* are then illustrated in association with the particular merchants 102*a* and 102*b* (and separate from other ones of the merchants 102*a*-*c*). It should be appreciated that the loyalty reward environment interface 400 may otherwise visually distinguish the merchants 102*a* and 102*b* in other examples, and their associated incentives, for viewing by the consumer 112 and other merchants. For example, a merchant with incentives associated therewith may be highlighted with a particular color, or may glow, etc., as compared to other merchants in the vicinity of the consumer 112 that do not have incentives (i.e., other merchants in the virtual representation 402 of the immediate surroundings of the consumer 112). This may also be done in connection with the consumer 112 implementing various incentive filters (e.g., via the application 116, etc.), so that merchants with particular incentives of interest to the consumer 112 may be highlighted with a particular color, or may glow, etc., as compared to other merchants in the vicinity.

In other embodiments, loyalty reward environment interfaces may represent incentives in other manners (e.g., other than in a virtual representation of the immediate surroundings of the consumer 112, etc.). For example, the consumer 112 may be able to direct the communication device 114 at his/her surroundings and, via camera input device 208, the loyalty engine 118 (via the application 116) may recognize certain merchants being viewed and cause different incentives to be displayed to the consumer 112, via the presentation unit 206 of the device 114, next to each of the merchants being viewed. Or, registered merchants may include computer-readable indicia (e.g., QR codes, etc.) in their storefronts relating to available incentives. Then, when the consumer 112 is in the vicinity of the merchants, he/she can scan the indicia via the communication device 114 and the loyalty engine 118 in turn recognizes the appropriate incentive(s) causes the incentive(s) to be displayed to the consumer 112, via the presentation unit 206 of the device 114.

With reference again to FIG. 3, once the loyalty reward environment is displayed at the communication device 114, the consumer 112 is able to navigate the environment (by actually moving in the consumer's physical environment) and move to the locations of the incentives, or move as indicated by the incentives in the environment. In so doing, the communication device 114 transmits location data to the loyalty engine 118, which then determines that the consumer 112 has moved or is moving, at 306, and adjusts the location of the consumer 112 in the loyalty reward environment, at 308. Alternatively, if the loyalty engine 118 determines that the consumer is not moving (at 306), the loyalty engine 118 takes no action and continues to monitor for movement of the consumer 112.

Next in the method 300, in connection with adjusting the location in the loyalty reward environment, the loyalty engine 118 determines, at 310, whether one or more incentives included in the loyalty reward environment (e.g., one or more of the incentives 404 and 406 in the loyalty reward environment interface 400, etc.) have been obtained by the consumer 112. In particular, for example, the loyalty engine 118 may determine when the location (or movement) of the consumer 112 in the loyalty reward environment is consistent with the location of (or instructions associated with) one or more of the incentives included in the loyalty reward environment (e.g., one or more of the incentives 404 and 406 in the loyalty reward environment interface 400, etc.). Then, when the loyalty engine 118 determines that an incentive is obtained (e.g., based on the location of the consumer 112 in the loyalty reward environment, etc.), at the merchant 102*a*, for example, the loyalty engine 118 awards the incentive to the consumer 112, at 312, and specifically to the consumer profile associated with the consumer 112 (and indicated in the data structure 120) (and/or associates the incentive with the consumer's payment account at the application 116). The loyalty engine 118 then compiles (or recompiles or updates, as appropriate) the loyalty reward environment for the consumer 112, at 302, to, for example, remove the incentive from the loyalty reward environment and update any incentive accumulation totals for the consumer 112. In connection with awarding the incentive to the consumer 112, the loyalty engine 118 may also identify other merchants within the merchant group of the merchant 102*a* and, further, identify potential incentives for the consumer 112 associated with such other merchants (e.g., based on the profile for the consumer 112, based on the consumer 112 obtaining the particular incentive from the merchant 102*a*, etc.).

In addition, or alternatively, after the incentive is awarded to the consumer 112, at 312, the loyalty engine 118 determines, at 314, whether the consumer 112 has achieved a next (or different) incentive level within the loyalty reward environment. Here, and as described above in the system 100, different incentive levels may be available to the consumer 112 within the loyalty reward environment. And, the different levels may be defined by (or segregated by) a number of incentives obtained/captured, a number of incentives redeemed, frequency of incentives redeemed (e.g., an incentive is redeemed at least twice a week for four consecutive weeks, etc.), total amount spent at a merchant or within a merchant group, etc. For example, when the consumer 112 originally accesses the loyalty reward environment, the consumer 112 may be at incentive level #1. But, after obtaining (and being awarded) an incentive (or multiple incentives), at 312, from the loyalty reward environment, the consumer 112 may advance to incentive level #2. In turn, the loyalty engine 118 determines that a next incentive level has been achieved (at 314) and, upon such advance, amends the consumer profile, at 316, to reflect the new level. And, as above, the loyalty engine 118 again compiles (or recompiles or updates, as appropriate) the loyalty reward environment for the consumer 112, at 302, to, for example, account for the advance of the consume from incentive level #1 to incentive level #2 (e.g., by adding different incentives to the environment associated with level #2, etc.).

Figure 5:
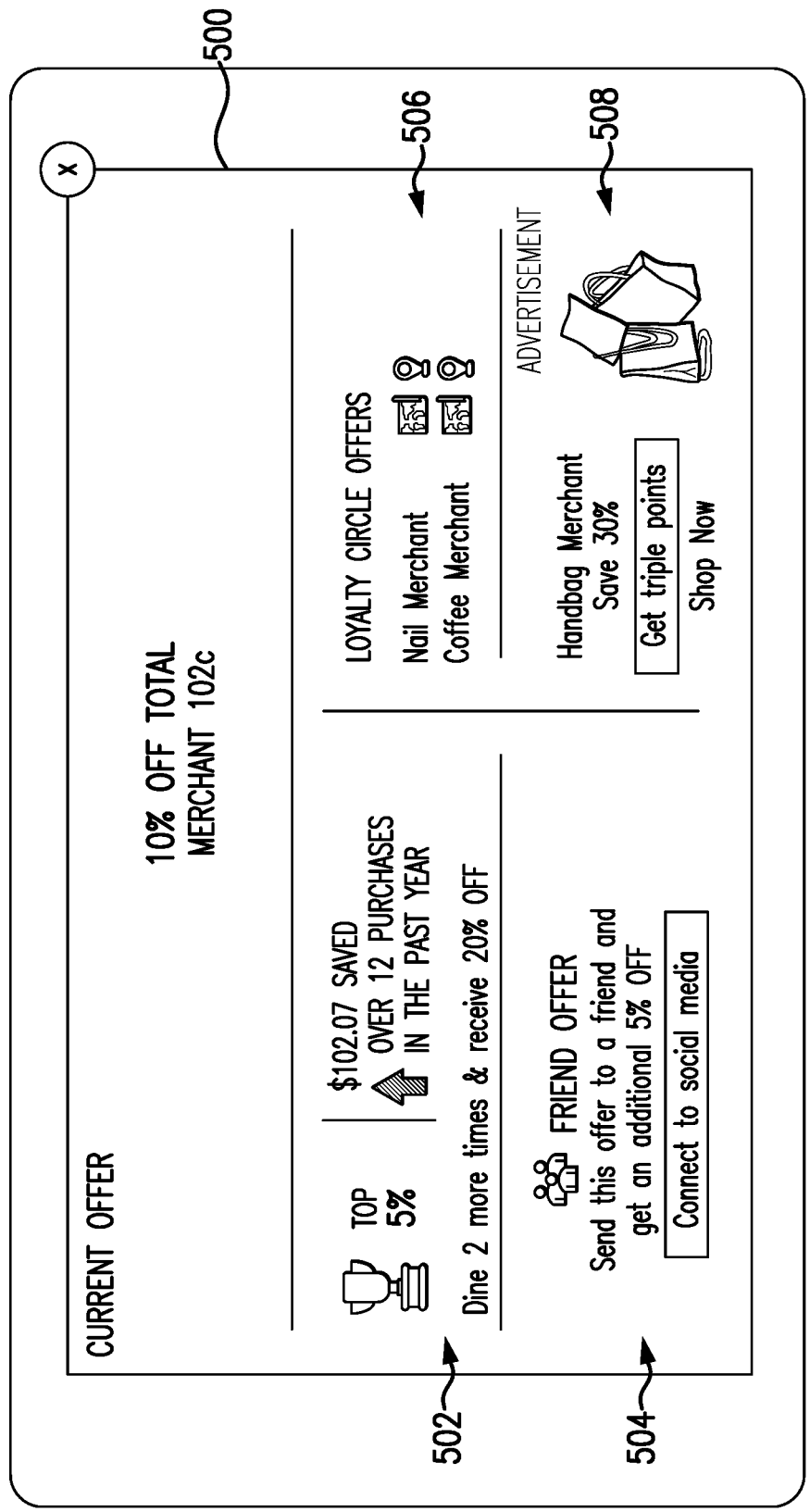
FIG. 5 is an exemplary incentive interface that may be displayed to a consumer of the group of reward oversees in connection with the loyalty reward environment of FIG. 4.

FIG. 5 illustrates an exemplary incentive interface 500 that may be displayed to the consumer 112 at the communication device 114, in connection with the method 300, when an incentive is obtained/awarded in the loyalty reward environment interface 400 of FIG. 4. In particular, the incentive interface 500 provides an indicator that the consumer 112 has currently achieved 10% off his/her total purchase at the merchant 102c. The incentive interface 500 also indicates, at 502, a historical savings at the merchant 102c for the consumer 112 (i.e., $102.07 saved over twelve purchases in the past year) and that the consumer 112 will achieve another incentive when he/she dines at the merchant 102c two more times (i.e., the consumer 112 will then be a top 5% consumer at the merchant 102c). In addition, the incentive interface 500 indicates, at 504, that the consumer 112 can forward the current offer to a friend (e.g., via social media such as via Facebook®, etc.) and receive an additional 5% off his/her total purchase at the merchant 102c. The incentive interface 500 further includes incentives relating to other merchants within the same merchant group as the merchant 102c. For example, the incentive interface 500 indicates, at 506, other merchants (i.e., a Nail Merchant and a Coffee Merchant) that have available incentives though the loyalty reward environment (and provides links to the incentives and map directs to the merchants), and, at 508, a merchant (i.e., Handbag Merchant) that has a particular incentive available to the consumer 112 through the loyalty reward environment (e.g., based on the consumer's profile, etc.).

It should be appreciated that the method 300 may be repeated time and again by the consumer 112, during which the consumer 112 obtains incentives from the merchants 102a-c (and/or from other merchants).

As an example, when the incentives include points, the consumer 112 may continue to obtain points through navigating and/or interacting with the loyalty reward environment, until a required number of points is obtained to redeem a desired product, discount, rebate, etc. (e.g., of the consumer's choosing, etc.). The points may then be accumulated (and tracked, for example) in the consumer's profile, for example, in his/her loyalty reward account. In some embodiment's, the points are earned, per merchant, where the consumer 112 has to obtain the requisite number of points at the particular merchant for redemption at the merchant. In some other embodiments, the points may be merchant-generic, where points obtained by interacting with one of multiple merchants (e.g., one of multiple merchants within one of the groups 122-126, etc.) may be redeemed for a discount, for example, at one of the multiple merchants.

As another example, when the incentives include discounts, rebates, etc., rather than points, the consumer 112 may continue to obtain, and collect, the incentives through navigating and/or interacting with the loyalty reward environment. Then, when desired by the consumer 112 (or otherwise), the loyalty engine 118 may permit the consumer 112 to combine and/or convert one or more of the collected incentives to provide an increased value incentive (e.g., combine/convert ten incentives for 1% off an entire purchase to 10% off a single item, etc.). Again, in so doing, the combined/converted incentives may be specific to a merchant within the loyalty reward environment (such that only incentives obtained from the specific merchant may be combined/converted for use at the specific merchant), or they may be applicable to a group of merchants (such that incentives obtained from any of the merchants in the group may be combined/converted for use at any of the merchants within the group).

With that said, it should be appreciated that the incentives obtained, whether as points or as discounts, rebates, etc., may be subject to redemption and/or conversion at the merchants 102a-c and/or loyalty engine 118 in a variety of different other manners.

Further, as the consumer 112 obtains incentives, the consumer 112 may opt to publish progress in the loyalty reward environment and/or incentives obtained to one or more social media providers, as part of the consumer's profile or as part of a loyalty reward environment profile shared among multiple consumers, whereby the consumers are able to see other point/incentives and/or provide comment or otherwise interact.

In view of the above, the systems and methods herein permit a merchant, through a loyalty reward environment, provided by a loyalty engine, to build consumer loyalty through incentives and gamification. In particular, by providing the incentives and including the incentives in the loyalty reward environment, the merchant (via the loyalty engine) engages the consumer in a game to obtain the incentives, which, depending on the incentives, permits the merchant to increase the consumer's presence at the merchant, increase purchases at the merchant, and increase loyalty of the consumer to the merchant. And, further, when applicable, permitting the consumer to convert and/or exchange the obtained incentives adds a dimension of consumer control to the incentive delivery, thereby permitting the consumer to be involved in tailoring the incentives to the consumer's likes, dislikes, and needs, etc. As can be appreciated, this may increase efficiency of the incentives for the merchant, over other known methods for disseminating incentive to consumers.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) associating a merchant with a group of reward offerors; (b) associating a consumer payment account with a group of reward offerees; (c) receiving and advertising to the reward offerees, a reward offer from the merchant; (d) receiving a transaction associated with the merchant and with the consumer payment account; (e) identifying, in a data structure, the merchant as a member of the group of reward offerors and the consumer payment account as associated with the group of reward offerees; and (f) based on the advertised reward offer and on the identified merchant, updating a loyalty reward account associated with the consumer payment account.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for offering loyalty rewards for transactions, the method comprising:
   compiling, by a computing device, a loyalty reward environment for a consumer associated with a payment account, the loyalty reward environment based on a location of the consumer and including an augmented reality representative of a physical environment in a general area of a communication device associated with the consumer;
   receiving, by the computing device, a first reward offer from a merchant;
   generating a first virtual object representative of the first reward offer;
   appending, by the computing device, the first virtual object in the loyalty reward environment for the consumer at a first geographic location associated with the merchant;
   making, by the computing device, the first virtual object available for viewing, on the communication device associated with the consumer, in the loyalty reward environment at the first geographic location, thereby advertising the first reward offer;
   receiving location data associated with the communication device;
   determining that the received location data indicates movement of the communication device to the first geographic location of the first virtual object;
   identifying, in a data structure, the payment account as associated with the consumer; and
   based on the advertised first reward offer and the determination that the location data indicates movement of the communication device to the first geographic location of the first virtual object, updating, by the computing device, a loyalty reward account associated with the identified payment account consistent with the first reward offer.

2. The computer-implemented method of claim 1, further comprising:
   receiving, by the computing device, a second reward offer from a second merchant;
   generating, by the computing device, a second virtual object representative of the second reward offer;

appending, by the computing device, the first virtual object in the loyalty reward environment at a second geographic location associated with the second merchant; and making, by the computing device, the second virtual object available for viewing, on the communication device associated with the consumer, in the loyalty reward environment at the second geographic location.

3. The computer-implemented method of claim 1, wherein the first geographic location is associated with the merchant, the method further comprising advertising, at the communication device, at least the existence of the first virtual object in the loyalty reward environment.

4. The computer-implemented method of claim 1, wherein updating the loyalty reward account comprises adding points to the loyalty reward account in accordance with the advertised first reward offer.

5. The computer-implemented method of claim 1, further comprising:

associating the consumer with a group of reward offerees; and prior to appending the first virtual object to the loyalty reward environment of the consumer, identifying the group of reward offerees to receive the first reward offer based on one or more of the following: affinity among the reward offerees, likelihood to complete purchases, affordability of merchant offerings, spending patterns, consumer behavior, weather-based shopping preferences, and temporal information.

6. The computer-implemented method of claim 1, wherein appending the first virtual object in the loyalty reward environment includes appending the first virtual object in the loyalty reward environment only when the consumer satisfies an incentive level associated with the first reward offer.

7. The computer-implemented method of claim 1, wherein the loyalty reward environment includes an augment reality environment viewable via the communication device.

8. A system for offering loyalty rewards for transactions, the system comprising:

a memory including a data structure, the data structure associating a merchant with a group of reward offerors, the data structure also associating a consumer with a group of reward offerees; and at least one processor coupled with the memory and configured to:

advertise to the group of reward offerees, including the consumer, a first reward offer from the merchant;

identify, in the data structure, the merchant as a member of the group of reward offerors and the consumer as associated with the group of reward offerees; and in response to the advertised first reward offer to the consumer:

generate a first virtual object for the first reward offer; and append the first virtual object to a loyalty reward environment at a first geographic location for display to the consumer at a communication device associated with the consumer, the loyalty reward environment including an augmented reality representation of a general area in which the communication device is present;

receive location data associated with the communication device;

determine whether the communication device has moved to the first geographic location based on the received location data; and in response to a determination that the communication device has moved to the first geographic location, associate the first reward offer with a payment account of the consumer.

9. The system of claim 8, wherein the at least one processor is further configured in response to the advertised first reward offer to the consumer, to make the first virtual object available for viewing, within the loyalty reward environment, on the communication device associated with the consumer when the communication device is in a predefined vicinity of the first geographic location.

10. The system of claim 9, wherein, prior to advertising the first reward offer, the at least one processor is further configured to receive an input from the communication device and identify the first reward offer from the data structure in the memory based on the input.

11. The system of claim 10, wherein the input is selected from the group consisting of a location of the communication device and a computer-readable indicia captured by the communication device.

12. The system of claim 9, wherein the at least one processor is further configured, in response to movement of the communication device relative to the merchant, to advertise a second reward offer to the consumer; and wherein the at least one processor is configured, in connection with advertising the second reward offer, to:

generate a second virtual object for the second reward offer;

append the second virtual object to the loyalty reward environment at a second geographic location associated with a second merchant of the group of reward offerors; and make the second virtual object available for viewing, within the loyalty reward environment, on the communication device when the communication device is in a predefined vicinity of the second geographic location.

13. The system of claim 9, wherein the at least one processor is further configured to advertise a second reward offer to the consumer; and wherein the at least one processor is configured, in connection with advertising the second reward offer, to:

generate a second virtual object for the second reward offer;

append the second virtual object to the loyalty reward environment at a second geographic location associated with another merchant of the group of reward offerors; and make the second virtual object available for viewing, within the loyalty reward environment, on the communication device when the communication device is in the predefined vicinity of the first geographic location.

14. The system of claim 8, further comprising executable instructions, which, when executed by the communication device, cause the communication device to transmit a purchase transaction to a payment network for a product based on the associated first reward offer, the purchase transaction identifying the payment account of the consumer, thereby permitting the payment network to identify the associated first reward offer based on the payment account included in the purchase transaction.

15. A non-transitory computer-readable storage media including executable instructions for use in facilitating reward offers to consumers, which, when executed by a processor, cause the processor to:
- identify a reward offer from a merchant in a data structure for presentation to a consumer when the consumer is in a predefined vicinity of the merchant;
- in response to the consumer satisfying an incentive level associated with the reward offer, generate a first virtual object for the first reward offer;
- append the first virtual object to a loyalty reward environment at a first geographic location associated with the merchant in the loyalty reward environment, the loyalty reward environment including an augmented reality representation of a general area of a communication device associated with the consumer;
- make the first virtual object available for viewing, within the loyalty reward environment, on the communication device associated with the consumer;
- receive location data associated with the communication device;
- determine whether the received location data indicates movement of the communication device to the first geographic location of the first virtual object; and
- based on a determination that the location data indicates movement of the communication device to the first geographic location of the first virtual object:
  - associate the first reward offer with a payment account of the consumer; and/or
  - update a loyalty reward account associated with the payment account consistent with the reward offer.

* * * * *